Oct. 30, 1923.
J. BREWER
FLOUR SIFTER
Filed Jan. 27, 1923
1,472,204
3 Sheets-Sheet 2
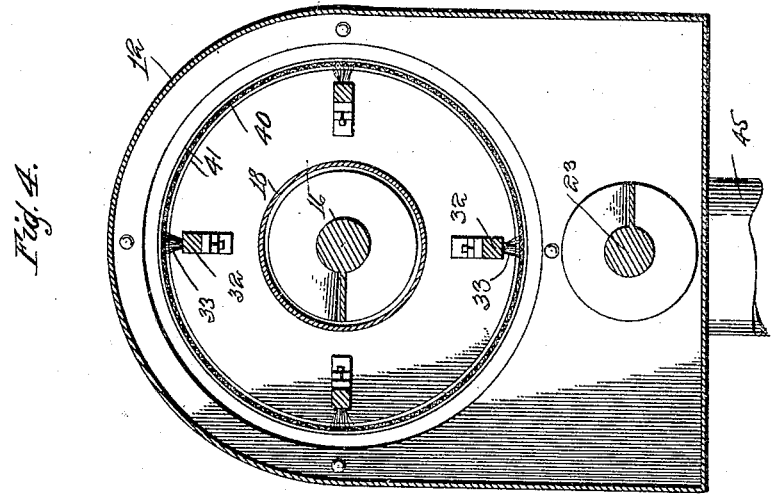
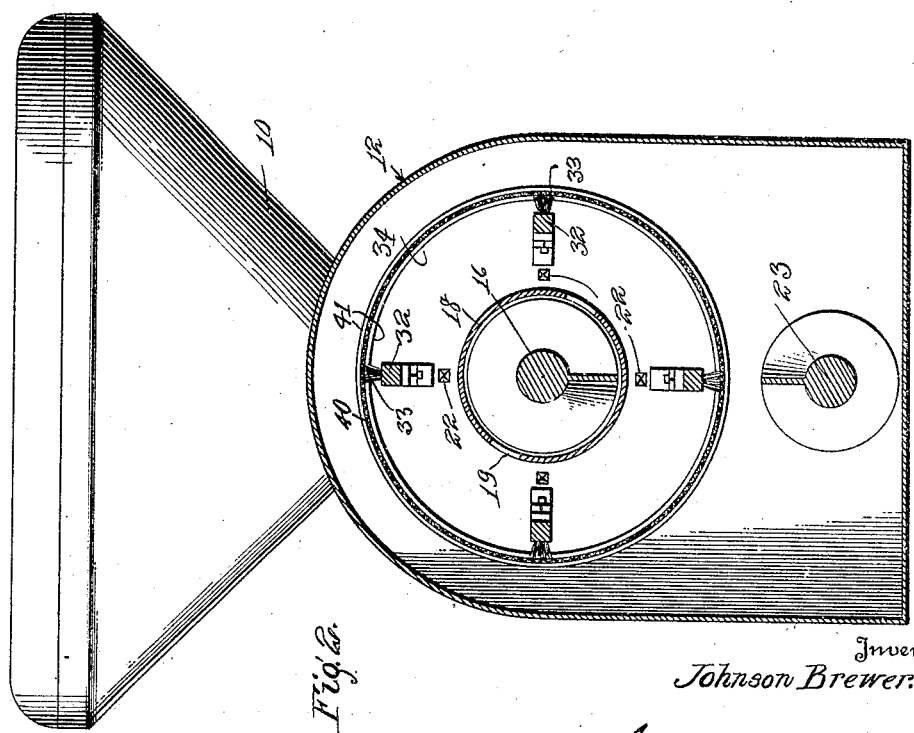
Inventor
Johnson Brewer

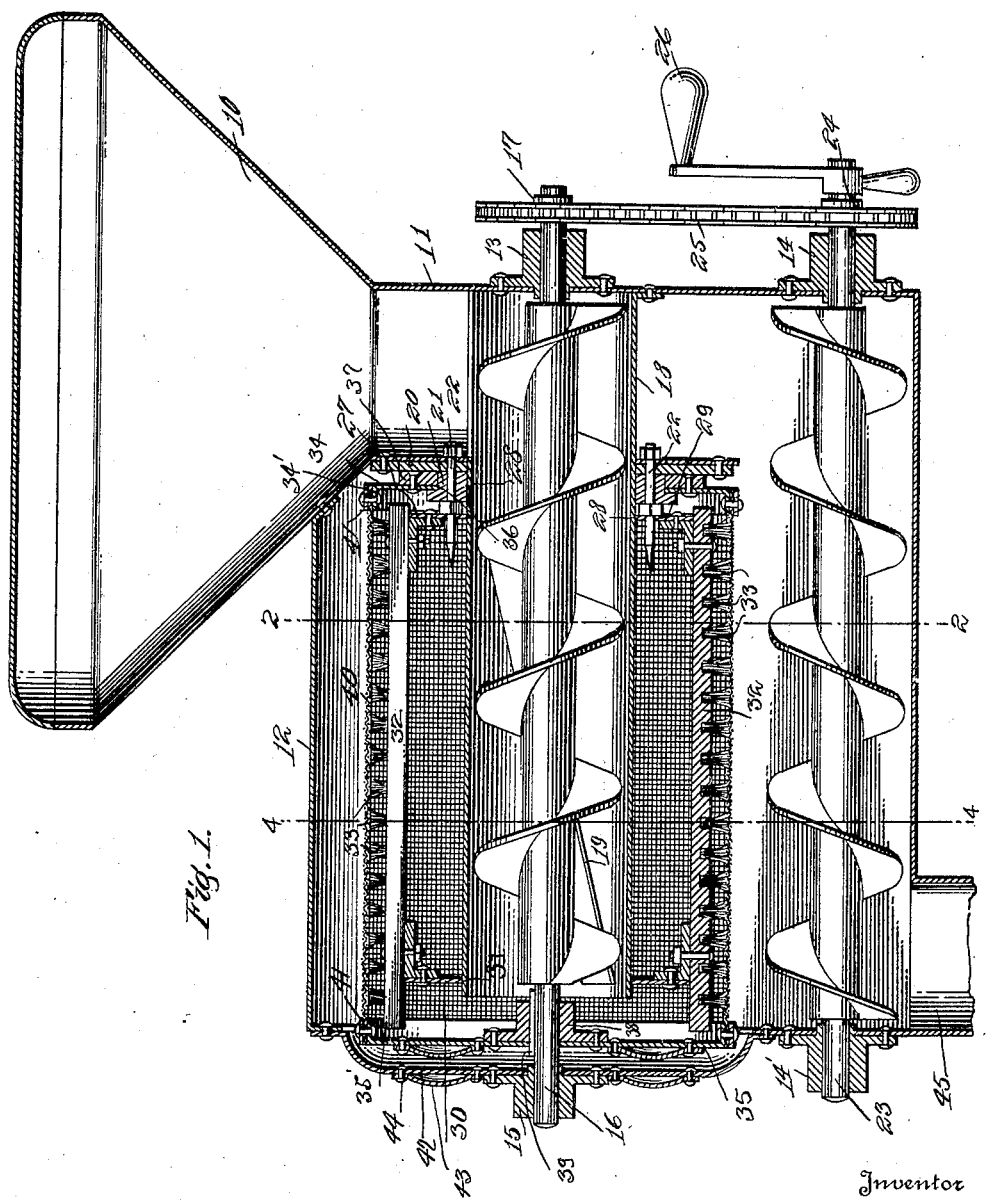

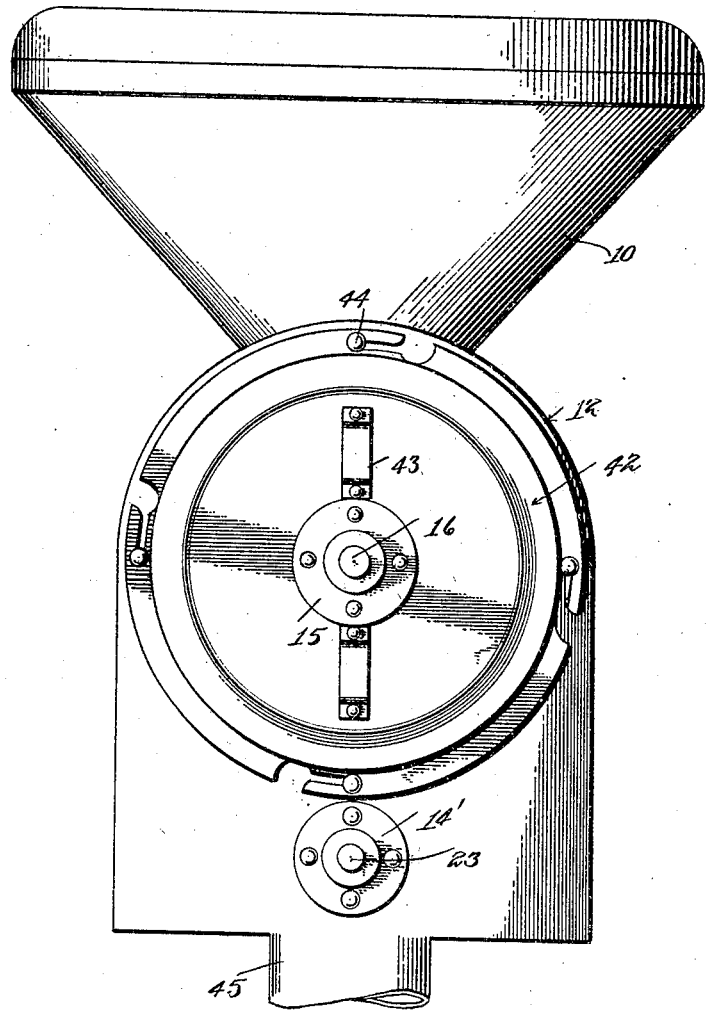

Patented Oct. 30, 1923.

1,472,204

UNITED STATES PATENT OFFICE.

JOHNSON BREWER, OF FERRIS, TEXAS.

FLOUR SIFTER.

Application filed January 27, 1923. Serial No. 615,300.

*To all whom it may concern:*

Be it known that I, JOHNSON BREWER, a citizen of the United States, residing at Ferris, in the county of Ellis, State of Texas, have invented certain new and useful Improvements in Flour Sifters; and I do hereby declare the following to be a full, clear, and exact description of the invention, such as will enable others skilled in the art to which it appertains to make and use the same.

This invention relates to new and useful improvements in flour sifters, and is an improvement on my prior Patents #1,390,334, issued September 13, 1921, and #1,429,565, issued September 19, 1922.

One object of the invention is to provide a flour sifter of this character which will properly and efficiently remove all foreign matter from the flour and render the flour in good condition for use.

Another object is to provide a device of this character wherein the flour is evenly distributed into the sifting means, and then conveyed to a suitable receptacle.

A further object is to provide novel and improved means for maintaining the brushes against movement, while the sifting drum is rotated thereabout.

Other objects and advantages will be apparent from the following description when taken in connection with the accompanying drawings.

In the drawings:

Figure 1 is a vertical longitudinal sectional view through the flour sifter.

Figure 2 is a vertical transverse sectional view on the line 2—2 of Figure 1, looking toward the right.

Figure 3 is an end view, showing the access door of the casing or housing.

Figure 4 is a vertical transverse sectional view on the line 4—4 of Figure 1, looking toward the left.

Referring particularly to the accompanying drawings, 10 represents a hopper, which has a depending spout or pipe 11, and connected with one side of this pipe is a laterally extending housing 12, the lower portion of which extends beneath the lower end of the said pipe. In the outer side of the pipe 11 there are mounted the bearings 13 and 14, the former being in the upper portion of the pipe, while the latter is disposed in the lower portions thereof. In the outer end of the housing 12, and in horizontal alignment with the upper bearing 13, is a similar bearing 15, and rotatably supported in these bearings are the ends of the screw conveyor shaft 16. The end of the shaft 16, below the hopper, projects beyond the side of the pipe, and beyond the bearing 13, where it is provided with a sprocket wheel 17. Extending longitudinally through the center of the housing 12, and into the pipe 11 is a tube 18, the portion thereof within the pipe 11 being cut away in its upper side to receive flour from the bin 10. Through this tube 18 the screw conveyor 16 is disposed, and rotates. In opposite sides of the portion of the tube 18, within the housing 12, there are formed the longitudinally extending and spirally arranged slots 19, through which the flour escapes into the sifter. Secured to the side of the pipe 11, around the adjacent end of the tube 18, is a disk 20, and extending inwardly into the housing, from this disk, is a peripherally flanged casting 21. Disposed through the pipe, the disk, and the said casting, are the pointed pins 22, to which reference will be made later herein. In the other end of the lower portion of the housing 12 there is mounted a bearing 14', and extending longitudinally in this portion of the housing, and having its ends rotatably supported in the bearings 14 and 14', is a second screw conveyor shaft 23. The inner end of the shaft 23 projects beyond the bearing 14, and is provided with a sprocket wheel 24, around which and around the sprocket wheel 17, is engaged an endless chain 25. On the same end of the shaft 23 there is mounted a crank handle 26, by means of which the two conveyor shafts may be rotated simultaneously, through the medium of the drive chain 25. In the housing, inwardly of the casting 21, there is disposed a disk 27, having a central opening 28, through which the tube 18 passes, and in this disk there are formed openings 29 which receive the before-mentioned pins 22, and whereby the disk is maintained against rotation. In the other end of the housing is a similar disk 30, having a central opening 31 for the reception of the adjacent end of the tube 18. Carried by the disks 27 and 30, adjacent their peripheries, are the angle members, and secured to said angle members, and extending longitudinally of the housing, are the bars 32, the outer faces of which are provided with the bristles 33. At opposite ends of the housing 10 are disposed disks 34 and 35, the former of which has a central opening 36 which receives the casting therein, said opening being of smaller diameter than the flange of said casting whereby the disk may rotate on the casting, between the flange thereof, and the adjacent disk 20. Secured to the disk 34, and surrounding the opening therein, is a ring 37, which serves as a bearing for the disk, as it rotates on the casting. Secured in the center of the other disk 35 is a bearing block 38, through which the adjacent end of the shaft 16 extends, said shaft being secured to the block by means of the key 39, and whereby the disk and shaft rotate together. The peripheral edges of the disks 34 and 35 are turned inwardly, as shown at 34' and 35', and secured to these inturned ends are the ends of the foraminous drum 40, which is disposed in enclosing relation to the brushes and against the inner face of which said brushes bear. Retaining and strengthening bands 41 are secured around the ends of the drum 40 and around its intermediate portion.

The outer end of the housing forms a door 42, which is arranged to be rotated about the adjacent end of the shaft 16, to engage and release the hook portions 43, with relation to the headed members 44. The adjacent end of the screen drum, namely the disk 35, is also mounted in the same manner, and is removable to permit access to the interior of the drum.

In the bottom of the housing, directly below the outer end of the screen drum, is an outlet opening 45, through which the sifted flour is adapted to be discharged to suitable receptacles, such as bags, bins, or the like.

It will be readily seen that, the hopper being filled with flour, and the crank handle being rotated, the two conveyors will also be rotated, the upper one carrying the flour into the tube 18, from whence the flour escapes into the drum 40, through the slots 19, and out through the openings of the drum to the lower conveyor. This lower conveyor carries the sifted flour to the outlet opening 45. The shaft of the conveyor 16 being secured to the block 38, will cause the drum to rotate. the adjacent end of the shaft turning freely in the bearing in the adjacent end of the housing, while the brushes remain stationary, and rub against the inner face of the drum, thus effectively breaking, cleaning, and sifting the flour.

Encircling the block 38 is a collar 46, and carried by the collar and radiating therefrom, are the arms 47, the outer ends of which are secured to the bars 32. The block 38 freely rotates within the same collar.

What is claimed is:

1. A flour sifting device comprising a hopper, a housing connected with the hopper, a rotatable screening drum mounted in the housing, a flour conveying tube disposed within the drum and communicating with the hopper, a flour moving means in the tube, stationary brushes bearing against the interior of the drum, a second flour moving means below the drum in position to receive sifted flour, and operative connections between the moving means and between one of the flour moving means and the drum for accomplishing the simultaneous rotation thereof.

2. In a flour sifter, a housing, a rotatable screening drum in the housing, a scraping means within the drum and including end disks and longitudinal brushes connected thereto, said end disks being centrally apertured, a longitudinally slotted tube disposed through the apertures of the said disks, a screw conveyor disposed in the tube and having one end connected with one end of the said drum for rotation therewith, and means on one end of the housing and engaged through one of the said end disks for holding the disks against rotation.

3. In a flour sifting device, a housing, a rotatable screening drum in the housing, a flanged disk mounted in one end of the housing, said drum including end plates having central apertures, one of said end plates receiving the flanged disk therein and being arranged to rotate thereon, the other disk having a bearing block in its aperture, a tube mounted in the flanged disk and extending within the drum, a stationary brushing means in the drum, and a conveyor within the said tube having one end secured within said block and rotatable in the adjacent end of the housing, and means connected with the other end of the conveyor for driving the same and the drum.

4. A flour sifter including a housing, one end of the housing being formed with an opening, a tube mounted in the opening at one end, a centrally apertured disk carried by said end of the housing and surrounding said opening, a flanged and centrally apertured casting secured to said disk and having openings therethrough, a screening drum surrounding the said tube and having centrally apertured end disks one of which receives the said casting therein and on which the disk rotates, and a stationary brushing means including end disks one of which has openings aligned with the openings of the casting, and pins secured within the casting openings and removably engaged in the brushing means disks for maintaining said brushing means against rotation.

In testimony whereof I affix my signature in the presence of two witnesses.

JOHNSON BREWER.

Witnesses:
LOLLIE A. JEFFERS,
S. S. HURLBUT.